July 22, 1947.        G. M. GIANNINI        2,424,451
FREQUENCY CONVERTER
Filed July 21, 1944
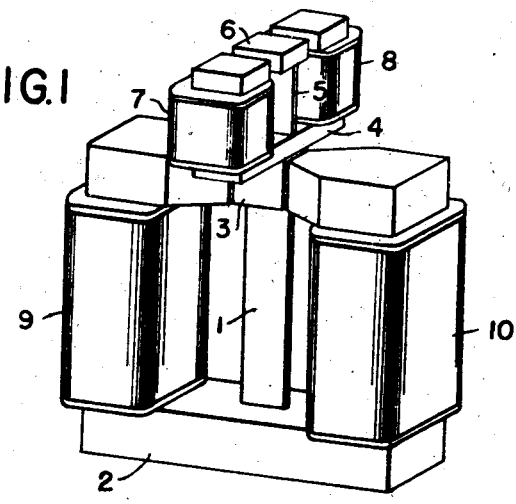
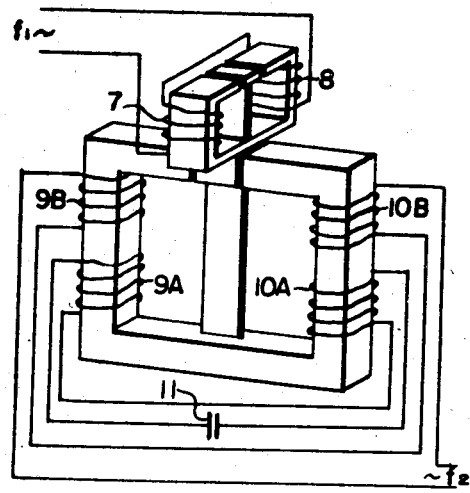 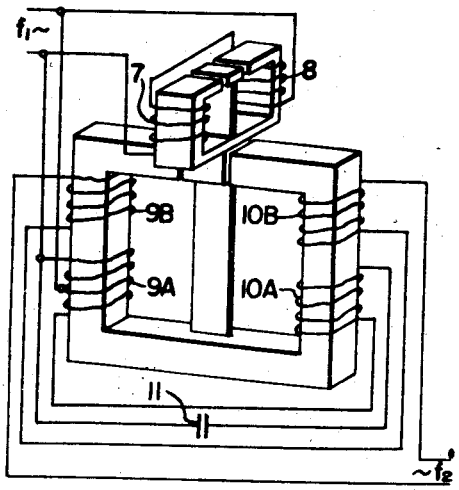
INVENTOR.
GABRIEL M. GIANNINI
BY
ATTORNEY Patented July 22, 1947

2,424,451

UNITED STATES PATENT OFFICE 2,424,451

FREQUENCY CONVERTER

Gabriel M. Giannini, West Los Angeles, Calif., assignor to Automatic Electric Laboratories, Inc., Chicago, Ill., a corporation of Delaware Application July 21, 1944, Serial No. 546,035

10 Claims. (Cl. 172—281)

1

The present invention pertains to methods and apparatus for obtaining current of one frequency from a source of current having a different frequency, and more particularly to means for obtaining current at a sub-multiple frequency of the driving source.

One specific application of the frequency converter herein disclosed is the production of 20 cycle ringing current for a telephone exchange from a commercial 60 cycle supply. At least two methods of accomplishing this result are at present in common use; first motor generator sets, and second static frequency converters employing saturable reactors and resonant circuits. The first method is objectionable in small exchanges because of its high initial cost and its large size. The second method relies on the production of transient currents by auxiliary switching devices to initiate free oscillations in a circuit which is resonant at the desired low frequency, and which oscillations are thereafter maintained by the commercial supply having a frequency which is an integral multiple of the desired low frequency current. One objection to this latter method is that the resonant frequency of the tuned circuit changes when the load varies, oftentimes sufficiently to stop the oscillations. Further switching equipment is therefore required to automatically restart the oscillations when and if this occurs.

The principal object of the present invention is to provide a frequency converter that is self-starting, stable in operation, has no wearing parts, and is economical to construct.

A further object of the invention is to provide a frequency converter employing mechanically tuned elements for stabilizing its operation.

Still another object of the invention is to provide a frequency converter employing mechanically tuned elements for periodically varying the characteristics of an electrically tuned circuit so as to sustain oscillations therein when it is electrically energized at one of its harmonic frequencies.

Other objects of the invention will appear upon a further examination of the specification and the accompanying drawing illustrating the invention in which:

Fig. 1 is a perspective view showing the mechanical construction of the converter.

Fig. 2 is a schematic diagram showing the use of the converter for transforming frequencies solely through mechanical coupling means.

Fig. 3 is a schematic diagram showing the use of the converter for transforming frequencies

2 with the mechanical coupling serving chiefly for control of the electrical circuits.

The aforementioned objects of the invention are realized by the employment of a pair of tuned reeds, one of which is secured in cantilever fashion at one end to a supporting frame, and the second of which is secured in cantilever fashion to the free end of the first reed. An electromagnetic driving means for the second reed is also secured to the free end of the first reed. The second reed is mechanically tuned to the input frequency by a magnetic armature secured to its free end. This reed is driven at its natural frequency when the electromagnet associated with it is energized at the input frequency. The combined weight of the second reed and its electromagnet is such that the first reed is resonant at a frequency which is an integral sub-multiple of the input frequency. A magnetic armature is also secured to the low frequency reed and it is associated with a second magnetic structure so as to periodically vary the reluctance of the magnetic structure when the reed is vibrating.

A unidirectional flux is conveniently produced in the second magnetic structure by using a permanent magnet for the armature of the low frequency reed. A winding is provided on the second magnetic structure which is shunted by a condenser of such a value as to tune the circuit to the desired low frequency. Vibration of the high frequency reed causes the low frequency reed to vibrate at its natural frequency. Vibration of the low frequency reed causes a low frequency voltage to be induced in the winding on the magnetic structure associated with it. The low frequency circulating current thus produced in the electrically tuned circuit helps to control the wave form of the flux in the magnetic circuit and stabilizes the operation of the vibrating reed. A second winding on the same magnetic structure is used to supply the desired low frequency current to the load. When operated in this manner the output is limited by the efficiency of the transfer of energy from the high frequency reed to the low frequency reed. In the preferred method of operation the previously described operations are used primarily to control the reluctance of the second magnetic structure. The commercial supply is connected to a portion of the winding on the second magnetic structure which forms a part of the electrically tuned circuit. It is well known that oscillations of one frequency may be sustained in a resonant circuit which has non-linear circuit elements by a driving source having a frequency which is an integral multiple of the frequency of the resonant circuit. The use of this principle permits energy to be delivered directly to the resonant circuit at the supply frequency and to be utilized at the desired low frequency, thus permitting the output energy to be far greater than that which can be delivered by the reeds alone.

Referring now to Fig. 1 of the drawing, the low frequency reed 1 is secured at its lower end to the magnetic frame 2. At the upper end of the reed 1 there is secured a permanent magnet 3 which is poled so as to produce a flux in the magnetic frame 2. A second magnetic field structure 4 is also secured to the free end of the reed 1. One end of the high frequency reed 5 is secured to the field structure 4 and it has a magnetic armature 6 secured to its free end. The armature 6 and reed 5 are proportioned so as to be mechanically resonant at the input frequency, which may be 60 cycles per second. The field structure 4, magnet 3, and reed 1 are proportioned so as to be mechanically resonant at one-half the desired output frequency, or to 10 cycles per second if the desired output frequency is 20 cycles per second for example. Two coils 7 and 8 are provided on the field structure 4. Two more coils 9 and 10, each of which may have several windings, are provided on the magnetic frame 2.

Referring now to Fig. 2, coils 7 and 8 are connected in series and are energized by a commercial alternating current source having a frequency $f_1$. The alternating flux produced in the field structure 4 by coils 7 and 8 acts on the armature 6 causing the reed 5 and armature 6 to vibrate at its natural frequency $f_1$. A portion of the input energy is transmitted to the low frequency reed 1 by reed 6 causing reed 1 and the entire high frequency structure to vibrate at its natural resonant frequency which is an integral sub-multiple of the input frequency $f_1$. This may be represented by $$\frac{1}{M}f_1$$

where M is an integer. Each time that the permanent magnet 3 swings out of the gap between the pole pieces of the magnetic frame 2 on one side the flux in the frame 2 is reduced, and as the magnet 3 returns to its normal position the flux in the frame 2 returns to its normal value. A corresponding variation in flux is produced when the magnet 3 swings out of the gap on the opposite side of the frame 2. Thus two pulsations in flux are produced in the frame 2 for each cycle of operations of magnet 3 and reed 1. The alternating voltage induced in the windings on the frame 2 is thus twice the frequency $$\frac{1}{M}f_1$$

of the low frequency reed. The frequency of this induced alternating voltage is the same as the output frequency $f_2$ which is therefore equal to $$\frac{2}{M}f_1$$

It is thus apparent that the output frequency is not necessarily limited to an integral sub-multiple of the input frequency when operated in this fashion. Windings 9A and 10A are connected in series with each other and with condenser 11. Condenser 11 and the windings 9A and 10A are proportioned so as to be resonant at the output frequency $f_2$. The output energy is secured from a second pair of series connected windings 9B and 10B.

In the preferred method of operation of the converter illustrated in Fig. 3 the source of energy is also connected to a portion of winding 9A. The vibrating system operates in the manner previously described but in this case the greater part of the energy required to maintain the oscillations in the resonant circuit including windings 9A and 10A and condenser 11 is supplied directly from the source. To accomplish this the resonant circuit must be tuned to an integral sub-multiple of the supply frequency. In this case the variations of magnetic flux in the frame 2 will be far greater than would be produced by the vibrating reed alone, and permits a corresponding greater output to be obtained from windings 9B and 10B.

While the preferred embodiment of the invention has been described it is to be understood that it is not limited to the particular form herein disclosed, but that many modifications therein may be made without departing from the scope of the invention as defined in the appended claims.

What is claimed is:

1. A frequency converter comprising in combination two mechanical vibratory elements having harmonically related natural periods of vibration, electrical driving means magnetically coupled to one of said elements so as to cause it to vibrate at its natural frequency when said driving means is energized with alternating current of one frequency, means coupling said vibratory elements so as to cause the second element to vibrate at its natural frequency when said one element is vibrating, a utilization circuit magnetically coupled to said second vibratory element, the vibration of said second vibratory element causing alternating current of a second frequency to be produced in said utilization circuit.

2. A frequency reducer adapted to be energized by a source of alternating current comprising a magnetic core including an air gap, means for producing a unidirectional flux in said core, a first vibratory element having a magnetic armature located in said air gap, a second vibratory element coupled to said first element and having a natural frequency of vibration which is an integral multiple of that of the first element, electromagnetic means for driving said second element at its natural frequency, said elements being so coupled as to cause the first element to vibrate at its natural frequency when the second element is so driven, and a winding on said magnetic core in which an alternating voltage is induced by the pulsations in said unidirectional flux caused by vibration of said magnetic armature.

3. A frequency reducer comprising a magnetic core, an electrically tuned circuit including a winding on said core, a source of alternating current associated therewith having a frequency which is an integral multiple of the resonant frequency of said tuned circuit, a utilization circuit coupled to said tuned circuit, and means for periodically changing the reluctance of said magnetic core mechanically so as to cause energy to be absorbed from said source by said tuned circuit and to be delivered to said utilization circuit at said resonant frequency.

4. A frequency reducer comprising in combination; a first mechanical vibratory element having a natural frequency of vibration $f$; a second mechanical vibratory element having a natural frequency of vibration $$\frac{1}{M}f$$

where M is an integer; a source of alternating current having a frequency $f$; electromagnetic driving means associated with said first vibratory element adapted to be energized by said source of alternating current; means coupling said vibratory elements so as to cause the second element to vibrate at its natural frequency $$\frac{1}{M}f$$

when the first element vibrates at its natural frequency $f$; and electromagnetic means associated with said second vibratory element for generating alternating current at a frequency $$\frac{2}{M}f$$

5. A frequency reducer as claimed in claim 4 including a circuit resonant at the frequency $$\frac{2}{M}f$$

coupled to said last electromagnetic means to control the wave form of the alternating current generated by said second vibratory element.

6. In a frequency reducer as claimed in claim 4 wherein M is an even integer, a circuit resonant at the frequency $$\frac{2}{M}f$$

coupled to said last electromagnetic means and connected to said source of alternating current.

7. A frequency reducing system comprising a source of alternating current, a circuit resonant at a sub-multiple frequency of that of said source coupled thereto, and mechanical means for periodically varying the electrical characteristics of said resonant circuit so as to produce sustained oscillations therein at said sub-multiple frequency.

8. An oscillatory system comprising in combination a circuit adapted to oscillate at a fundamental frequency and at the harmonics thereof, means for initiating and sustaining oscillations therein at said fundamental frequency, and a source of alternating current having a frequency which is an harmonic of said fundamental frequency coupled to said circuit for reinforcing the oscillations therein at the fundamental frequency.

9. An oscillatory system comprising in combination a circuit adapted to oscillate at a fundamental frequency and at the harmonics thereof, a mechanical vibratory element for initiating oscillations in said circuit at said fundamental frequency, and a source of alternating current having a frequency which is an harmonic of said fundamental frequency coupled to said circuit for sustaining oscillations therein at said fundamental frequency.

10. A frequency converter comprising in combination two mechanical vibratory elements having harmonically related natural periods of vibration, a source of alternating current of one frequency, means energized by said source for driving one of said elements at its natural frequency, means coupling said vibratory elements so as to cause the second element to vibrate at its natural frequency when said one element is so driven, and means for generating an alternating current of a second frequency in response to the vibration of said second element.

GABRIEL M. GIANNINI.

REFERENCES CITED

The following references are of record in the file of this patent:

UNITED STATES PATENTS

| Number | Name | Date |
|---|---|---|
| 2,347,200 | Lehde | Apr. 25, 1944 |